Figure 1:
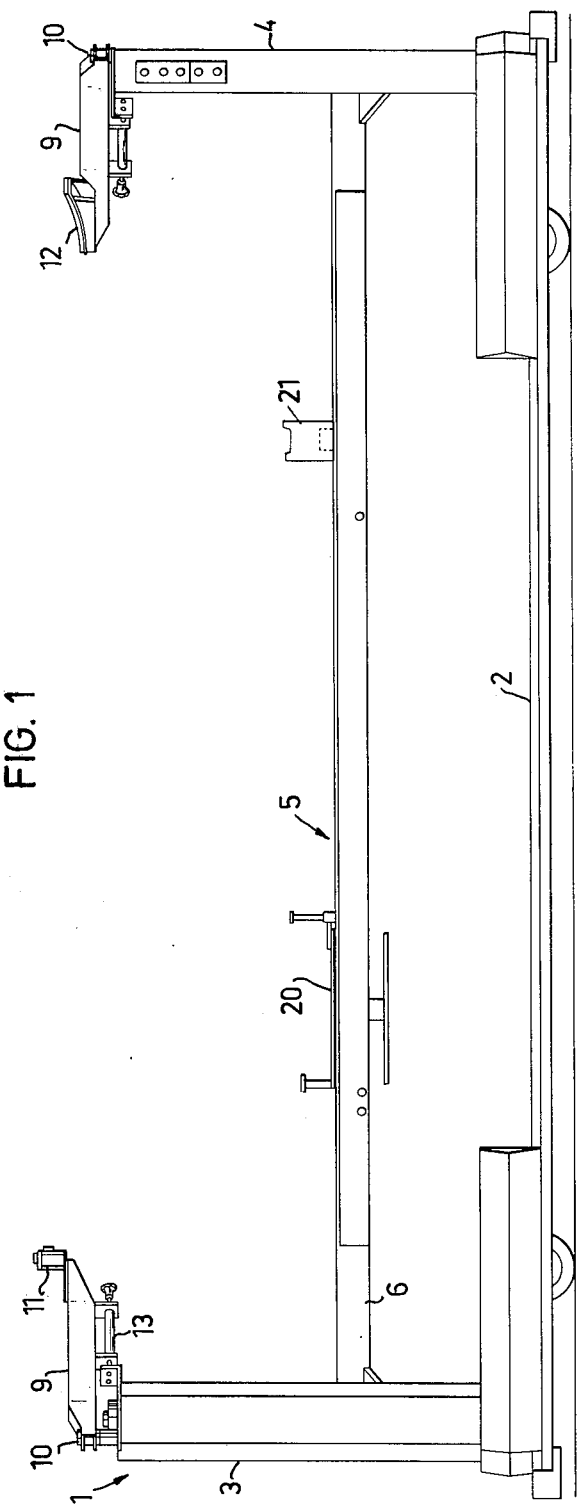

United States Patent [19]

Lindfors

[11] 4,031,982

[45] June 28, 1977

[54] DEVICE FOR MOUNTING CHASSIS DETAILS ONTO AN AUTOMOBILE BODY

[75] Inventor: Olov Halvar Lindfors, Goteborg, Sweden

[73] Assignee: AB Volvo Penta, Goteborg, Sweden

[22] Filed: Mar. 20, 1975

[21] Appl. No.: 560,556

[30] Foreign Application Priority Data

Mar. 22, 1974 Sweden .............................. 7403918

[52] U.S. Cl. ..................... 187/8.59; 187/9 R; 214/1 D
[51] Int. Cl.² ............................................. B60S 13/00
[58] Field of Search ............ 269/58; 214/1 D, 1 A, 214/1 R; 187/8.41, 8.59, 8.43, 8.45, 9 R; 29/200 A, 200 P, 200 J; 254/2 R, 2 B, 2 C

[56] References Cited

UNITED STATES PATENTS

| 1,410,103 | 3/1922 | Lightner et al. | 254/2 R |
| 1,561,753 | 11/1925 | Swanner | 187/8.59 |
| 1,876,759 | 9/1932 | Romine | 29/200 A |
| 2,593,635 | 4/1952 | Walker | 187/8.41 X |
| 2,843,223 | 7/1958 | Villars | 187/8.59 X |
| 3,321,180 | 5/1967 | Hutchinson | 187/8.59 X |
| 3,365,026 | 1/1968 | Mancini | 187/8.43 |
| 3,724,602 | 4/1973 | Hernick | 187/8.54 |

FOREIGN PATENTS OR APPLICATIONS

| 1,499,520 | 9/1967 | France | 187/8.59 |
| 245,320 | 6/1969 | U.S.S.R. | 187/8.43 |

*Primary Examiner*—Frank E. Werner
*Attorney, Agent, or Firm*—Young & Thompson

[57] ABSTRACT

The invention relates to a device for mounting chassis details onto an automobile body. The device comprises a platform upon the forward and rear ends of which a frame is arranged, said frame bearing automobile body supports and a fixture for the chassis detail and said fixture being raisably and lowerably arranged on the frame for movement towards and from the automobile body supports.

2 Claims, 3 Drawing Figures

DEVICE FOR MOUNTING CHASSIS DETAILS ONTO AN AUTOMOBILE BODY

The present invention relates to a device for mounting chassis details onto an automobile body, said device comprising a platform upon the forward and rear ends of which a frame is arranged, said frame bearing automobile body supports and a fixture for the chassis details, said fixture being raisably and lowerably arranged on the frame for movement towards and from the automobile body supports.

A device such as the one disclosed above is previously known by U.S. Pat. No. 3,968,559. The known device has transverse bars arranged on the frame, said bars supporting the body by means of a support beam composed of longitudinal, mutually connected support beams which are attached to the body at its normal jack attachments. The transverse bars are raisable and lowerable between an upper position for receiving the body and a lower position immediately above a fixture for chassis details. The fixture 18 raisable and lowerable between a lower position for suitable working height for the mutual assembly of chassis details and an upper position for the assembly of the body and chassis. One disadvantage with the known device is that the body and chassis, after being assembled together, cannot be lowered to the lower comfortable working height position of the fixture in continued assembly work. Rather, it must be moved to a lower device by means of special lifting equipment, said lower device having corresponding transverse bars for the support beams.

The purpose of the present invention is to obtain a device of the kind disclosed in the preamble, said device eliminating the above-mentioned disadvantage and making it possible for the body and chassis, after assembly, to be raised and lowered to each level which is most suitable in relation to the different operations of continued assembly work.

This is achieved according to the invention by means of the fixture being raisable to a level at which it directly and/or by means of chassis details resting on the same relieves the weight of the body from the supports and by means of the supports being removable from the body so that the body can be lowered onto the fixture together with the chassis details.

In this manner, the body and chassis details can, after removal of the supports, be lowered to the lowest position of the fixture, if desired, or to each suitable level between its uppermost and lowest position. As the fixture itself lifts the body from the supports, the need for special lifting equipment is eliminated.

The invention is described in more detail below with reference to the enclosed drawings showing examples.

Figure 2:
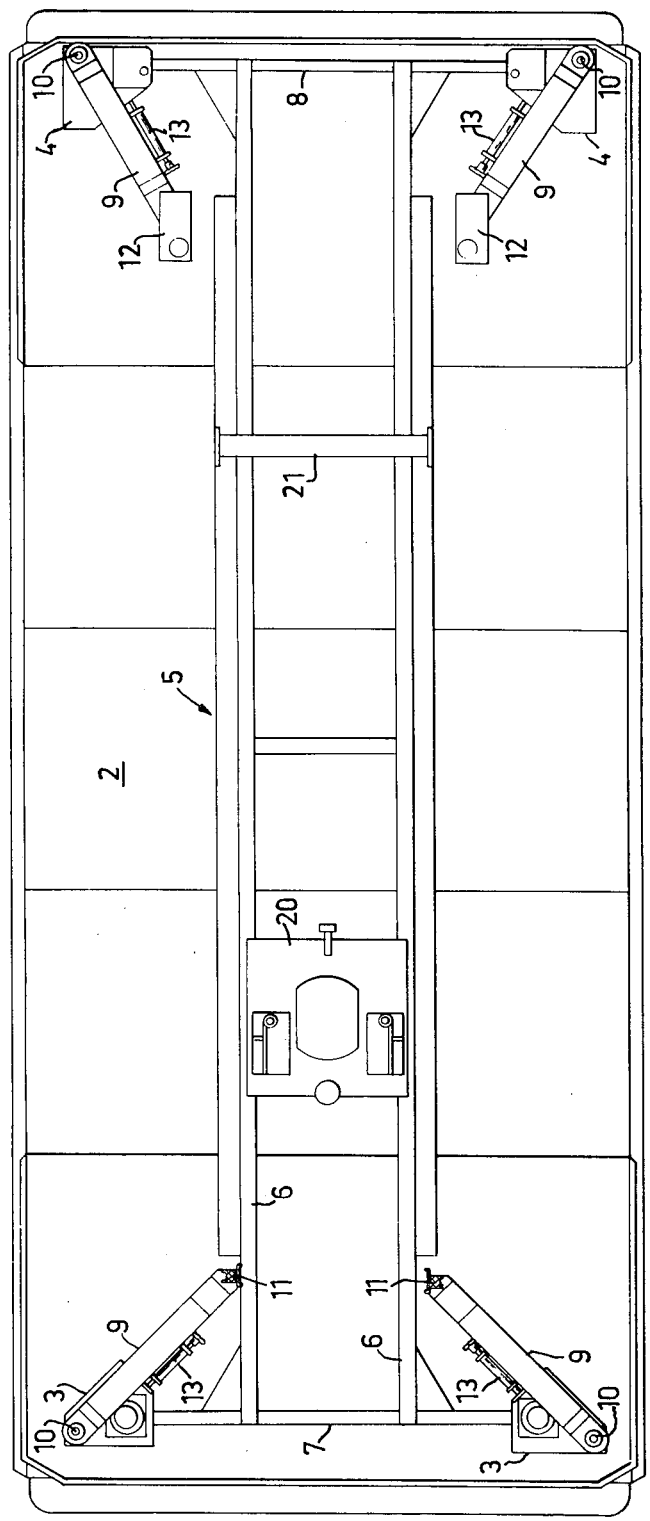
Figure 3:
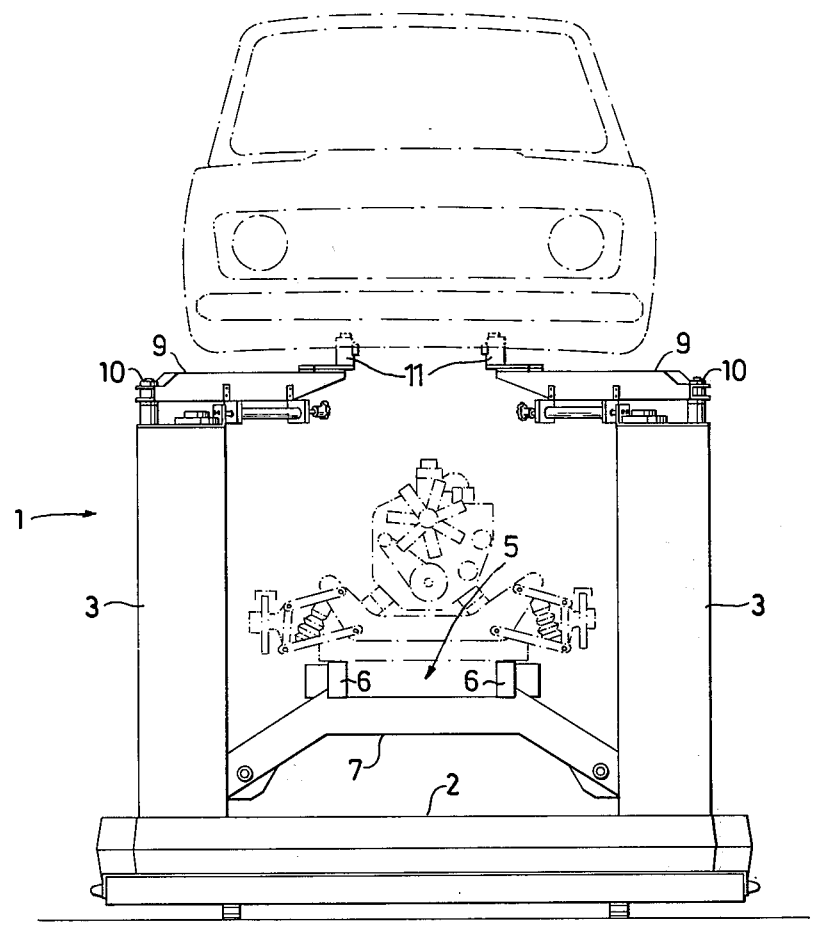

FIG. 1 is a side-view of a device for mounting chassis details onto an automobile body, said device being borne by a car, FIG. 2 is a top plan view of the device in FIG. 1, and FIG. 3 is an end elevational view of the device according to FIGS. 1 and 2.

The shown car 1 can be of the kind described in the above-identified patent, that is, a motor-powered car which is remote-controlled along an assembly path by means of signals emitted from a guiding cable running along the assembly path.

The underframe 2 of the car 1 forms a rectangular platform, each corner of which supports frames in the form of forward and rear pillars 3 and 4, respectively. A fixture 5 for chassis details extends between the forward and rear pair of pillars 3 and 4. The fixture 5 comprises longitudinal beams 6, the ends of which are connected to transverse beams 7, 8 which extend between the respective pairs of pillars 3 and 4. The ends of the beams 7, 8 extend into openings (not shown here) which extend along the entire length of each pillar 3, 4 and engage with vertical guides and/or lifting means (not shown here) arranged in each respective pillar so that the beams 7, 8 and thereby the entire fixture 5 is raisable and lowerable a distance corresponding to the total height of the pillars 3, 4. If only vertical guides are arranged in each pillar 3, 4, the fixture 5 can be lifted and lowered by means of separate lifting equipment as shown in the above-mentioned patent. Alternatively, the guides can also form lifting means, for example, if they are jack screws, which engage with nuts arranged at the ends of the beams 7, 8. The screws can be coupled to a common drive axle via gears. An outer drive motor can be coupled to said drive axle.

Horizontal support arms 9 are arranged at the upper end of the pillars 3, 4, said support arms 9 being swingable on vertical pins 10. Supports 11 are attached to the outer ends of the forward support arms 9 and supports 12 are attached to the ends of the rear support arms. The body is intended to be placed on the supports 11, 12 and the arms 9 are then, as is most clearly shown in FIG. 2, directed at an angle in towards the middle of the platform 2. Spring-loaded locking bolts 13 which are connected to the support arms 9 push into corresponding recesses arranged in the upper ends of the pillars 3, 4 and lock the support arms 9 in this position. The locking of the support arms 9 in the support position can be released by means of manual activation of the bolts 13, after which the support arms 9 can be moved to a position parallel to the short sides and/or long sides of the platform 2 and there be locked by means of the locking bolts 13 being brought into engagement with corresponding recesses.

The device according to the invention is used in the following manner during assembly work:

The details and components which are to be attached to the bottom side of the body are placed in the fixing arrangements of the fixture 5 while the fixture 5 is placed in a lower position, wherewith the motor and gear box are fixed by arrangement 20 and the rear axle by arrangement 21. A certain joining together of details and components takes place.

The body is thereafter placed on supports 11 and 12 above the fixture 5, with the support arms 9 disposed and locked into the position shown in FIG. 2.

The fixture 5 is raised to an upper position at which the body comes into contact with certain chassis details and/or supports (not shown here) on the fixture 5. By means of the bent form (c.f. FIG. 3) of the transverse beams 7, 8 and by means of the outer ends of the beams being able to be lifted all the way up to the upper ends of the pillars 3, 4, the body can herewith be lifted a slight distance above supports 11 and 12 so that they can be relieved or unloaded and the support arms 9 are swung out of the way in a forward direction and locked, the forward arms in a position parallel to the short side of the platform and the rear arms in a position parallel to the long sides of the platform. After this, the body with the chassis details can be lowered and raised to all levels allowed by the fixture 5 so that continued assembly can be carried out at those levels which are most suitable for the various assembly operations.

What I claim is:

1. Device for mounting chassis details onto an automobile body, said device comprising an elongated rectangular platform, wheels supporting said platform, upright members mounted upon opposite ends of said platform at the corners of said platform, support means for an automobile body mounted on the upper part of each of said upright members, for movement between a first position under the body and a second position at the side of the body, said support means comprising support arms, said mounting means for said support means comprising vertical axles on which said arms are mounted for horizontal swinging movement between said first and second positions, a fixture for chassis details supported by the platform, each of said upright members having a jack connected to said fixture for raising the fixture relative to the platform to a level at which it relieves the weight of the body from said support means when said support means are in said first position and for lowering the fixture relative to the platform to lower the body when the support means are in said second position.

2. Device according to claim 1, and means for releasably locking said support arms in each of said first and second positions.